(12) United States Patent
Zimmer

(10) Patent No.: US 6,608,458 B2
(45) Date of Patent: Aug. 19, 2003

(54) ELECTRIC MOTOR, IN PARTICULAR WIPER MOTOR

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/882,475

(22) Filed: Jun. 15, 2001

(65) Prior Publication Data

US 2002/0000782 A1 Jan. 3, 2002

(30) Foreign Application Priority Data

Jun. 30, 2000 (DE) .......................................... 100 31 925

(51) Int. Cl.$^7$ ................................................. G05B 5/00
(52) U.S. Cl. ..................... 318/445; 318/254; 318/439; 318/138; 318/432; 318/434; 388/815; 388/928.1
(58) Field of Search .................................. 318/254, 439, 318/138, 432, 434, 445; 388/815, 928.1

(56) References Cited

U.S. PATENT DOCUMENTS

| 5,347,214 A | | 9/1994 | Haussecker |
| 5,689,159 A | | 11/1997 | Culp |
| 5,847,530 A | | 12/1998 | Hill |
| 6,053,843 A | * | 4/2000 | Van Vuuren et al. ......... 477/45 |

FOREIGN PATENT DOCUMENTS

| DE | 196 15 581 A | 10/1997 |
| EP | 0 458 211 A | 1/1991 |

* cited by examiner

*Primary Examiner*—Karen Masih
(74) *Attorney, Agent, or Firm*—Michael J. Striker

(57) ABSTRACT

An electric motor for operating a device for wiping a window of a motor vehicle has an electric motor part, and a control device for controlling/regulating a power of the electric motor part, the control device being formed so that it is programmable with a parameter a power limiting by limiting a torque to a nominal torque.

10 Claims, 2 Drawing Sheets

ELECTRIC MOTOR, IN PARTICULAR WIPER MOTOR

BACKGROUND OF THE INVENTION

The present invention relates to an electric motor, in particular a wiper motor for operating a device for wiping of a window of a motor vehicle, a series of electric motors, in particular wiper motors, as well as to a method of producing an electric motor.

Numerous electric motors for operation of a wiper device are known and produced in great numbers. In connectionally produced series of electric motors manufacturing and material tolerances result in dissipation of given-out power of the individual electric motors. In order to reliably operate a wiping device, the electric motor is designed so that the weakest electric motor of the series must be suitable for operation of the wiping device. It is however problematic to design the wiping device so that, in particular in the case of blockage, it can not be damaged by the strongest electric motor of the series. The movable parts of the wiping device must be much stabler than required for normal operation of the wiper device.

This forced overdimensioning increases the material for manufacturing cost and increases the dimensions and therefore the space required for the wiper device in the motor vehicle.

SUMMARY OF THE INVENTION

Accordingly, it is an object of the present invention to provide an electric motor of the above mentioned general type which has the advantage of a power limitation by a parameter is realized in a very simple and fast way at the end of a series manufacture. Conventional electric motors for operation of a wiping device are designed with an electronic system for control/regulation in which such a power limitation is not easily implemented.

When the electric motor is designed in accordance with the present invention, it eliminates the disadvantages of the prior art and provides for the highly advantageous results.

It is especially advantageous when the control device has a signal input for supplying the parameter, the nominal torque or an axial torque for supplying the parameter itself, or one or several variables for determination of the parameter into the control device.

It is further advantageous when the control device has a memory device for storing the parameter. In this manner the parameter must be supplied in a short time, for example during a monitoring at the end of a manufacturing line. It remains there until a change or until the end of the service life of the electric motor.

In accordance with another advantageous feature of the invention, when the control device is formed as an electronic control device, there are all possibilities to make available a modern control or regulation. In this matter, also complex algorithms can be utilized for control/regulation.

In accordance with another advantageous feature of the invention, when the electronic control device has a microcontroller for computation and/or storage of the parameter, then the storage and control complexity is further increased.

In accordance with another advantageous feature of the invention, when the microcontroller is formed so that from the supplied nominal and/or actual torque the parameter can be determined, then the time and labor expenses during a band end testing are reduced to a minimum and thereby the costs are further reduced.

Furthermore, it is advantageous when the parameter is formed from the quotients of nominal torque and actual torque, since this linear statement is easy to handle and is sufficiently accurate for many cases.

A series of electric motors, which are provided with a parameter for power limitation, wherein all electric motors from the series layer produce the same nominal torque, has the advantage that an accurately adjusted design of the linkage of the wiping device is possible, since the linkage of the wiping device must not receive any power overcapacity of the electric motor.

The method of producing an electric motor of the present invention has the advantage that all electric motors which are produced with this method are exactly limited as to their output power or their torque.

When the power variables are determined by mechanical braking of the driven electric motor with simultaneous measurement of a further characteristic value, that it is especially advantageous since as a rule during a band end control at the end of a manufacturing band a testing run is performed, and therefore for programming of the control device can occur directly after the end of the testing run. The braking process at the end of the testing run can be used for determination of the power variable.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
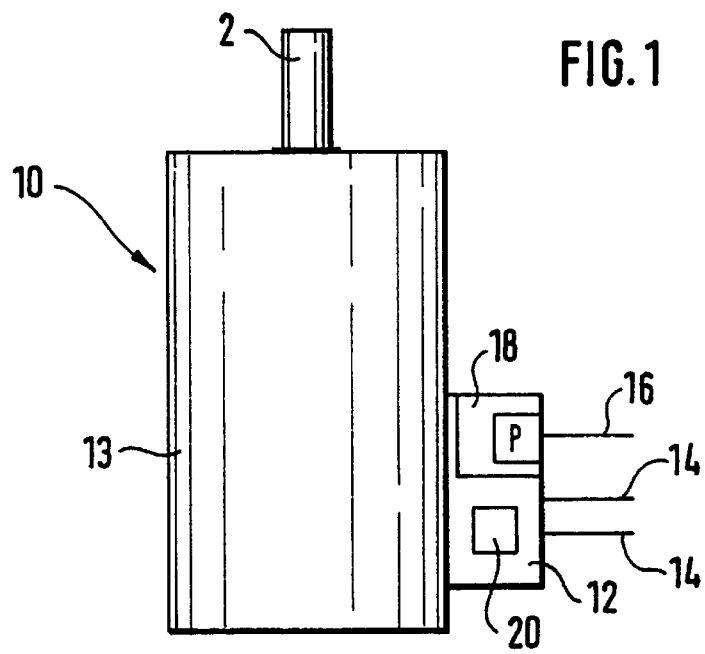
FIG. 1 is a view schematically showing an electric motor in accordance with the present invention.

An electric motor in accordance with the present invention shown in FIG. 1 is identified with reference numeral 2. It has a control device 12 and a motor part 13. The control device 12 is formed as an electronic control device which controls the motor part 13 in dependence on input signals which are communicated through connection pins 14.

The control device 12 also has a signal input 16, through which the control device 12 can be programmed. In particular, for this purpose the control device 12 has a memory unit 16 in which a parameter P is stored. Typically the signal input 16 has several, in particular 8 to 16 pins for programming the control device 12 digitally in accordance with conventional technology.

Figure 3:
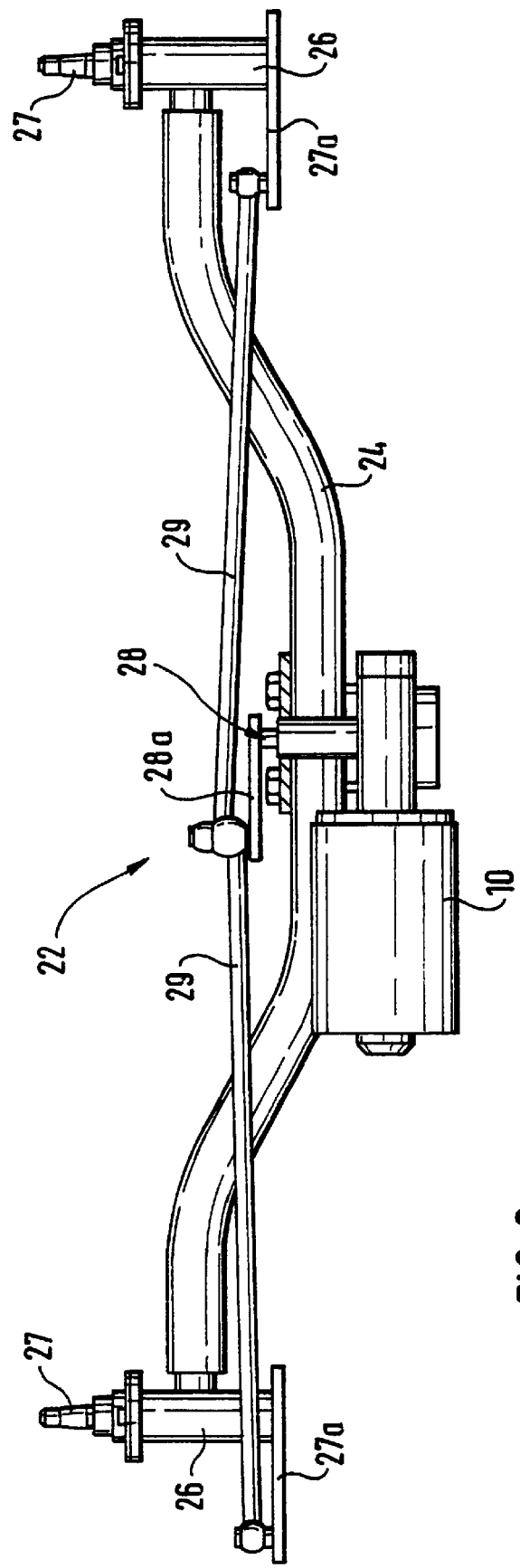
FIG. 3 is a view showing a linkage of a wiping device in a schematic representation.

FIG. 3 shows a linkage 22 of a wiping device with an electric motor 10. The linkage 22 substantially has a tubular element 24, on which the electric motor is mounted substantially centrally. The tubular element has two ends each provided with a wiper bearing 26. Wiper shafts 27 are supported in the wiper bearings. They are non-rotatably connected with the not shown wiper arms which carry the wiper blades.

A driven shaft 28 of the electric motor 10 is provided with a first crank 28a for driving the wiper arm. It is non rotatably connected with the driven shaft. A displacement rod 29 is moved by the crank and drives a second crank 27a which is non-rotatably connected with the wiper shaft 27. Thereby the reciprocating movement of the wiper shaft 27 is provided, and an oscillating movement of the wiper arm and the wiper blade is provided as well.

The operation of the inventive electric motor 10 is explained herein below.

In operation a voltage is applied from zero to Umax at the connection pins 14. In accordance with the invention the control device 12 is first supplied at one time with the parameter P. It corrects the current which flows through the connection pins 14 or the voltage applied to the motor part 13. The correction can be a simple factor, which must be sufficient for reducing the current I and/or the voltage U. For this purpose the parameter P is measured, so that the desired maximum motor torque is produced by the motor exactly when at the connection pins 14 the voltage $U_{max}$ is provided, in particular in a blockage case.

The parameter P is determined for example at the end of the manufacturing process of the electric motor 10. In particular the torque produced by the electric motor is determined at the applied maximum voltage $U_{max}$, and subsequently the desired nominal torque is divided by the determined torque. From this division a parameter is produced, which is so great that during application of the maximum voltage $U_{max}$ to the connection pins 14 a torque which is higher than the desired maximum torque can not be produced by the electric motor 10.

In the case of blockage when the wiper arm for example is blocked by an excessive snow load on the window, the maximum torque of the electric motor 10 also acts on the linkage 22. By limiting of this torque, it is effectively prevented that the crank 27a or 27b or the displacement rod 27 are plastically deformed.

In accordance with the principle involved, in these direct current motors the maximum torque is obtained during stopping. When the electric motor 10 is braked, the torque can be measured at different rotary speeds and extrapolated to the stopping- or maximum torque. The parameter P is determined so that the maximum torque is not exceeded.

Figure 2:
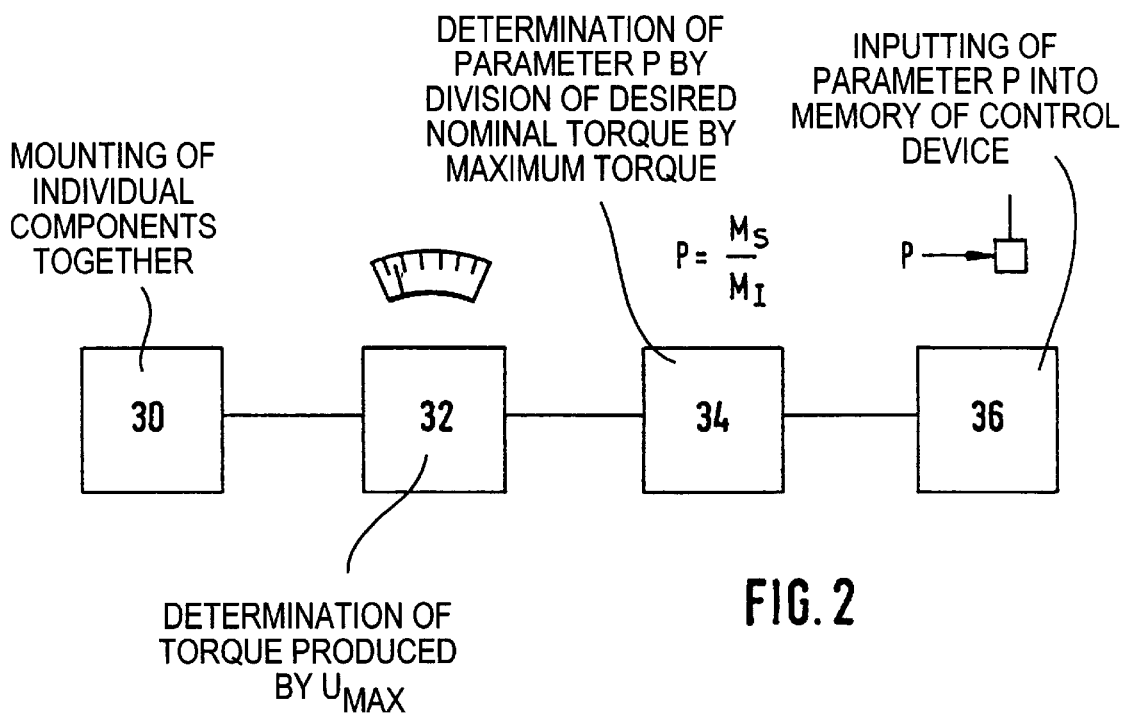
FIG. 2 is a view schematically showing a method for producing electric motors.

FIG. 2 illustrates the method steps for producing an inventive electric motor.

In the first step 30 in the individual components of the electric motor are mounted together. In a second step 32 the torque produced at $U_{max}$ is determined. In a third step 34 the desired nominal torque is divided by the maximum torque measured in the second step 32, and correspondingly from the produced torque and the nominal torque the parameter P is determined. In a fourth step 36 the parameter P determined in the third step 34 is inputted into the storage memory device 18 of the control device 12.

The power magnitude, such as for example the maximum torque can be determined by mechanical braking of the driven electric motor with simultaneous measurement of further characteristic variables. For example, the motor can be braked by a magnetic brake. For determination of the maximum torque of an electric motor, numerous further methods are known as well.

Naturally, here only one of many known methods of determination of the parameter P is provided. The parameter P is measured so that during application of the voltage $U_{max}$ the nominal torque maximum can be produced.

It will be understood that each of the elements described above, or two or more together, may also find a useful application in other types of constructions differing from the types described above.

While the invention has been illustrated and described as embodied in electric motor, in particular wiper motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An electric wiper motor for operating a device for wiping a window of a motor vehicle, comprising an electric motor part; and a control device for controlling/regulating a power of said electric motor part, said control device being programmable with a parameter for a power limiting by limiting a torque to a nominal torque of said electric motor part so that the electric wiper motor is a torque-limited motor.

2. An electric wiper motor as defined in claim 1, wherein said control device has at least one input for supplying at least one value selected from the group consisting of the parameter P, a nominal torque and an actual torque.

3. An electric wiper motor as defined in claim 1, wherein said control device has a memory for storing the parameter P.

4. An electric wiper motor as defined in claim 1, wherein said control device is an electronic control device.

5. An electric wiper motor as defined in claim 4, wherein said electronic control device has at least one microcontroller for calculation and storage of the parameter P.

6. An electric wiper motor as defined in claim 4, wherein said electronic control device has a microcontroller for determination of the parameter P from supplied nominal and/or actual torque.

7. An electric wiper motor as defined in claim 1, wherein said control device is formed so that the parameter P is formed by a quotient of a nominal torque and an actual torque.

8. A series of electric wiper motors each having an electric motor part, and a control device for controlling/regulating a power of said electric wiper motors, said control device being programmed with parameter P for power limiting by a limiting torque to a nominal torque, so that a power of each of the electric wiper motors of the series is limited to an identical maximum nominal torque so that the electric wiper motors are torque limited electric wiper motors.

9. A method of producing an electric wiper motor for wiping devices of motor vehicles including en electric motor part and a control device programmable with a parameter P for a power limiting by limiting a torque to a nominal torque, the method comprising the steps of mounting individual components of the electric wiper motor; determining a power variable; determining a parameter P for power limiting; and inputting the parameter P into a control device so as to form the electric wiper motor as a torque-limited electric wiper motor.

10. A method as defined in claim 9; and further comprising determining the power variable by a mechanical braking of the driven electric wiper motor with a simultaneous measurement of a further characteristic value.

* * * * *